(12) United States Patent
Kakuta et al.

(10) Patent No.: US 6,364,493 B1
(45) Date of Patent: Apr. 2, 2002

(54) IMAGE DISPLAYING APPARATUS

(75) Inventors: Yoshinori Kakuta; Shinji Okamori; Shosuke Oka; Akio Kiriyama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/849,492

(22) Filed: May 7, 2001

(30) Foreign Application Priority Data

Oct. 26, 2000 (JP) .......................................... 12-326368

(51) Int. Cl.[7] .............................................. G03B 21/14
(52) U.S. Cl. ...................................... 353/122; 385/901
(58) Field of Search ............................ 353/38, 98, 119, 353/122; 385/901, 133

(56) References Cited

U.S. PATENT DOCUMENTS 5,634,704 A * 6/1997 Shikama et al. ............. 353/102
5,902,033 A * 5/1999 Levis et al. ................. 353/122
6,005,722 A * 12/1999 Butterworth et al. ......... 353/98
6,139,156 A * 10/2000 Okamori et al. ............. 353/98
6,205,271 B1 * 3/2001 Bowron et al. ............... 385/31
6,272,269 B1 * 8/2001 Naum ......................... 385/901

FOREIGN PATENT DOCUMENTS

JP    A11326727    11/1999

* cited by examiner

Primary Examiner—William Dowling (57) ABSTRACT

A video-displaying apparatus uses a rod integrator that converts light emitted from a light source into uniform light. The apparatus includes a rod integrator, a holding member, and a flat spring. The rod integrator has a first surface, a second surface that opposes the first surface, a third surface, and a fourth surface that opposes the third surface. The holding member has a first contact surface which abuts the second surface, and a second contact surface which abuts the fourth surface. The first and second contact surfaces have smaller areas than the second and fourth surfaces, respectively. The rod integrator is fixedly mounted to the holding member such that the rod integrator is sandwiched between the holding member and the flat spring mounted to the holding member. Only the projections formed in the spring abut the first and third surfaces.

6 Claims, 14 Drawing Sheets

IMAGE DISPLAYING APPARATUS

BACKGROUND OF THE INVENTION

1. Field of the Invention

The present invention relates to a holding construction for holding an optical component of an optical system for use in a liquid projector and a DLP projector. The present invention relates more particularly to a holding construction for holding a rod integrator that provides uniform distribution of brightness in an image plane, and to a video image-displaying apparatus that employs such a holding construction.

2. Description of the Related Art

Figure 15:
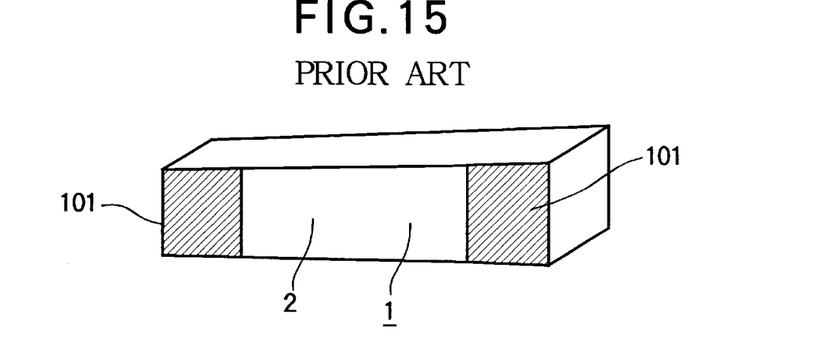
FIG. 15 illustrates a prior art rod integrator disclosed in Laid-open Japanese Patent (KOKAI) No. 11-32672.

FIG. 15 illustrates a prior art rod integrator disclosed in Laid-open Japanese Patent (KOKAI) No. 11-326727.

Figure 16A:
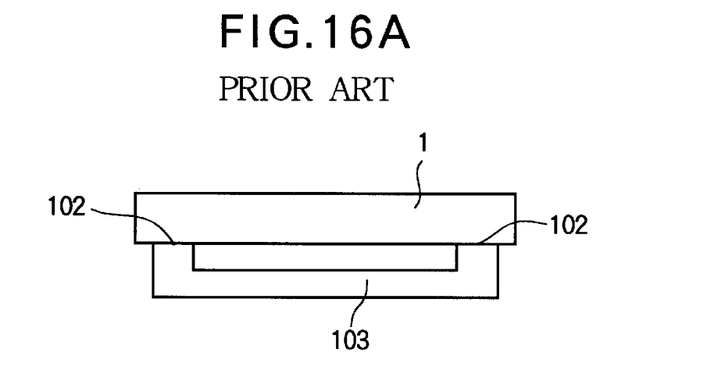
FIGS. 16A–16C illustrate the rod integrator held by a holding member.
Figure 16B:
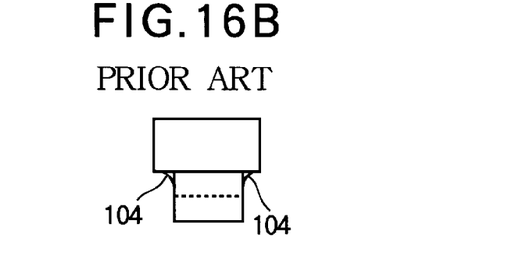
Figure 16C:
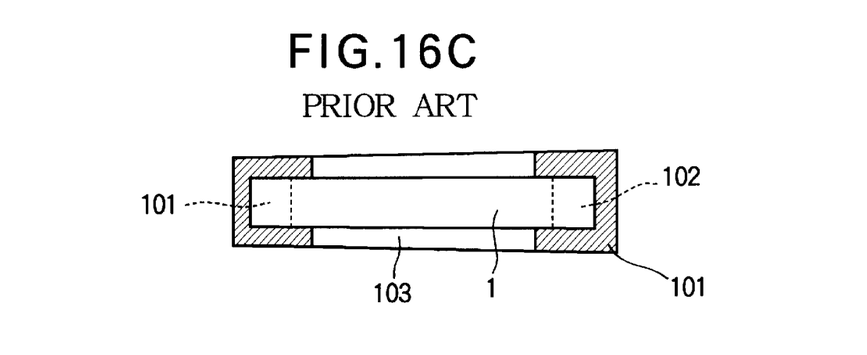

FIGS. 16A–16C illustrate the prior art rod integrator held by a holding member.

A rod integrator 1 has a reflecting side surface 2. If the reflecting side surface 2 is in contact with a light-absorbing material, the intensity of the light reflected from the side surface 2 decreases. In order to prevent this problem, aluminum reflective layers 101 are deposited at two locations on the reflecting side surface 2, the two locations being spaced apart from each other in a longitudinal direction of the side surface 2.

A holding member 103 has two contact surfaces 102 that are connected to the reflecting side surface 102 by an adhesive 104. The contact surface 102 is smaller in area than the reflective layer 101. As shown in FIG. 16B, the adhesive 104 is also applied to the holding member 103 and the reflecting layer 101 to surround the holding member 103, so that the holding member 103 is firmly connected to the rod integrator 1. This construction reduces non-uniform illuminance of light exiting the rod integrator 1.

The aforementioned conventional construction requires more number of manufacturing stages because an aluminum layer needs to be deposited on a part of the side surface 2 of the rod integrator 1. Thus, the aforementioned conventional construction is costly. In addition, when the rod integrator 1 is mounted to the holding member 103, the holding member 103 may be inadvertently mounted to a side opposite to a side on which the aluminum is vapor-deposited. Thus, the aforementioned prior art suffers from poor assembly efficiency. Moreover, the adhesive is subjected to increases and decreases in temperature within the video-displaying apparatus, loosing adhesion gradually. Deterioration of the adhesive may cause the rod integrator 1 to drop from the holding member 103 when the assembly is subjected to vibration and/or impact. Thus, bonding is not reliable. If the rod integrator 1 is to have a larger area in contact with the holding member 103 for enhanced reliable bonding effect, then the aluminum must be vapor-deposited to a larger area on the rod integrator. However, the reflection by the vapor-deposited aluminum is less efficient than the total reflection in the glass material. As a result, increasing an area of the rod integrator 1 in contact with the holding member 103 decreases the amount of light exiting the rod integrator 1.

SUMMARY OF THE INVENTION

The present invention was made in view of the aforementioned problems.

An object of the invention is to provide a reliable holding means for holding a rod integrator.

A video-displaying apparatus uses a rod integrator that converts light emitted from a light source into uniform light. The apparatus comprises a rod integrator, a holding member, and a flat spring. The rod integrator has a first surface and a second surface that opposes the first surface. The holding member has a first contact surface to which the second surface abuts. The first contact surface has a smaller area than the second surface. The flat spring has at least one spherical projection. The rod integrator is fixedly mounted to the holding member such that the rod integrator is sandwiched between the holding member and the flat spring mounted to the holding member. Only the projection abuts the first surface of the rod integrator.

The rod integrator further includes a third surface and a fourth surface that opposes the third surface. The at least one projection may be one of a plurality of projections. The holding member further includes a second contact surface having a smaller area than the fourth surface. The fourth surface abuts the second contact surface and only the projections abut the first surface and the third surface of the rod integrator.

The holding member is an assembly separate from a base on which optical components are mounted. The rod integrator includes an incidence surface and an exiting surface that have the same aspect ratio as a video image incident on the rod integrator. The holding member is positioned such that an optical axis of the rod integrator is at a predetermined position regardless of the aspect ratio. The spring has at least one elongated hole that extends in a direction substantially perpendicular to the optical axis of the rod integrator.

The base comprises a chamber in which the rod integrator is housed such that light incident on the rod integrator passes through the chamber. The holding member has a first wall and the base has a second wall such that the first wall and second wall are arranged side by side to define a part of the chamber and a gap between the first wall and second wall is minimal.

The rod integrator may have a recess formed therein and the recess receives the projection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

The present invention will be described in detail by way of example with reference to the accompanying drawings.

Figure 1:
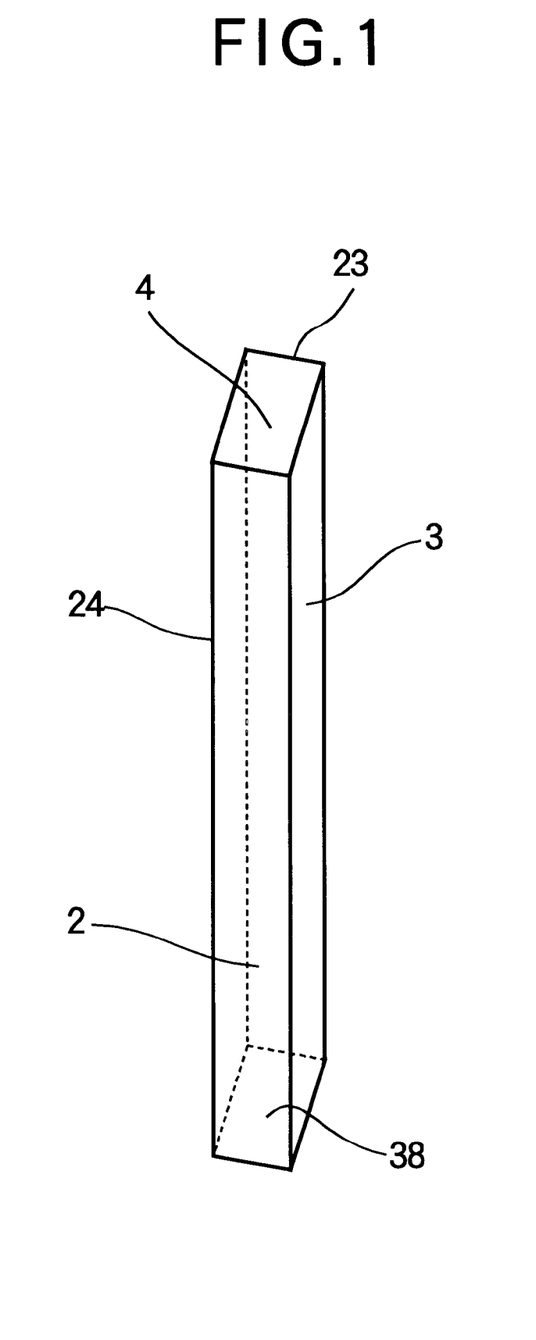
FIG. 1 is a perspective view of a rod integrator according to the present invention.

FIG. 1 is a perspective view of a rod integrator according to the present invention.

The rod integrator 1 has a generally long, rectangular shape and has a first side surface 2, a second side surface 23 that opposes the first surface 2, a third side surface 3, and a fourth side surface 24 that opposes the third surface 3. The rod integrator 1 also has an incidence surface 38 that opposes an exiting surface 4.

Figure 2:
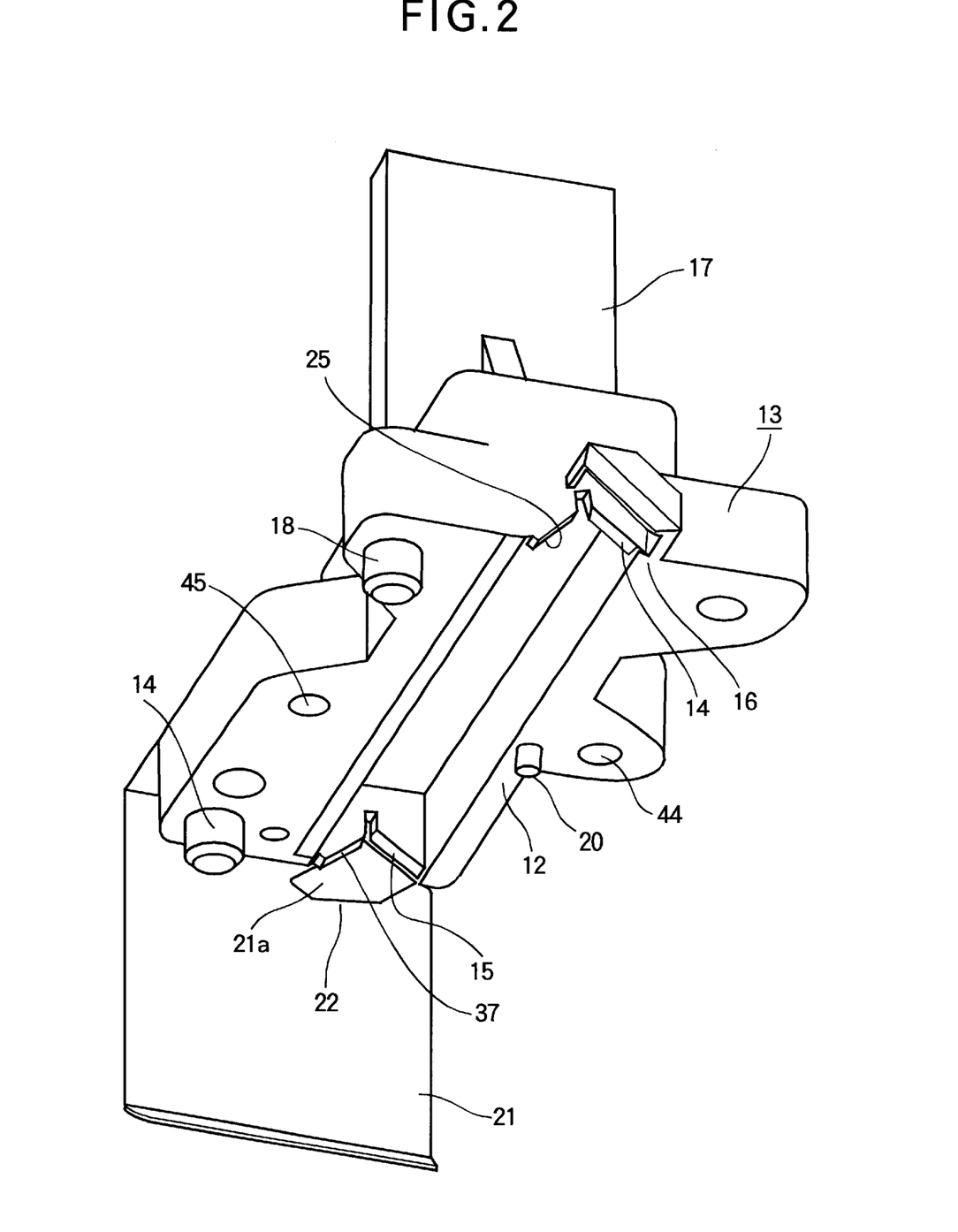
FIG. 2 is a perspective view illustrating a holding member.

FIG. 2 is a perspective view illustrating a holding member 13.

The holding member 13 has contact surfaces 14 and 25 which abut an upper portion of the second surface 23 and an upper portion of the fourth surface 24 of the rod integrator 1, respectively. The holding member 13 also has contact areas 15 and 37 which abut the lower portion of the second side surface 23 and the lower portion of the fourth side surface 24 of the rod integrator 1.

The rod integrator 1 is in contact with the contact surfaces 14 and 25 and the contact surfaces 15 and 37 of the holding member 13. The rod integrator 1 is not in contact with other parts of the holding member 13.

Figure 3:
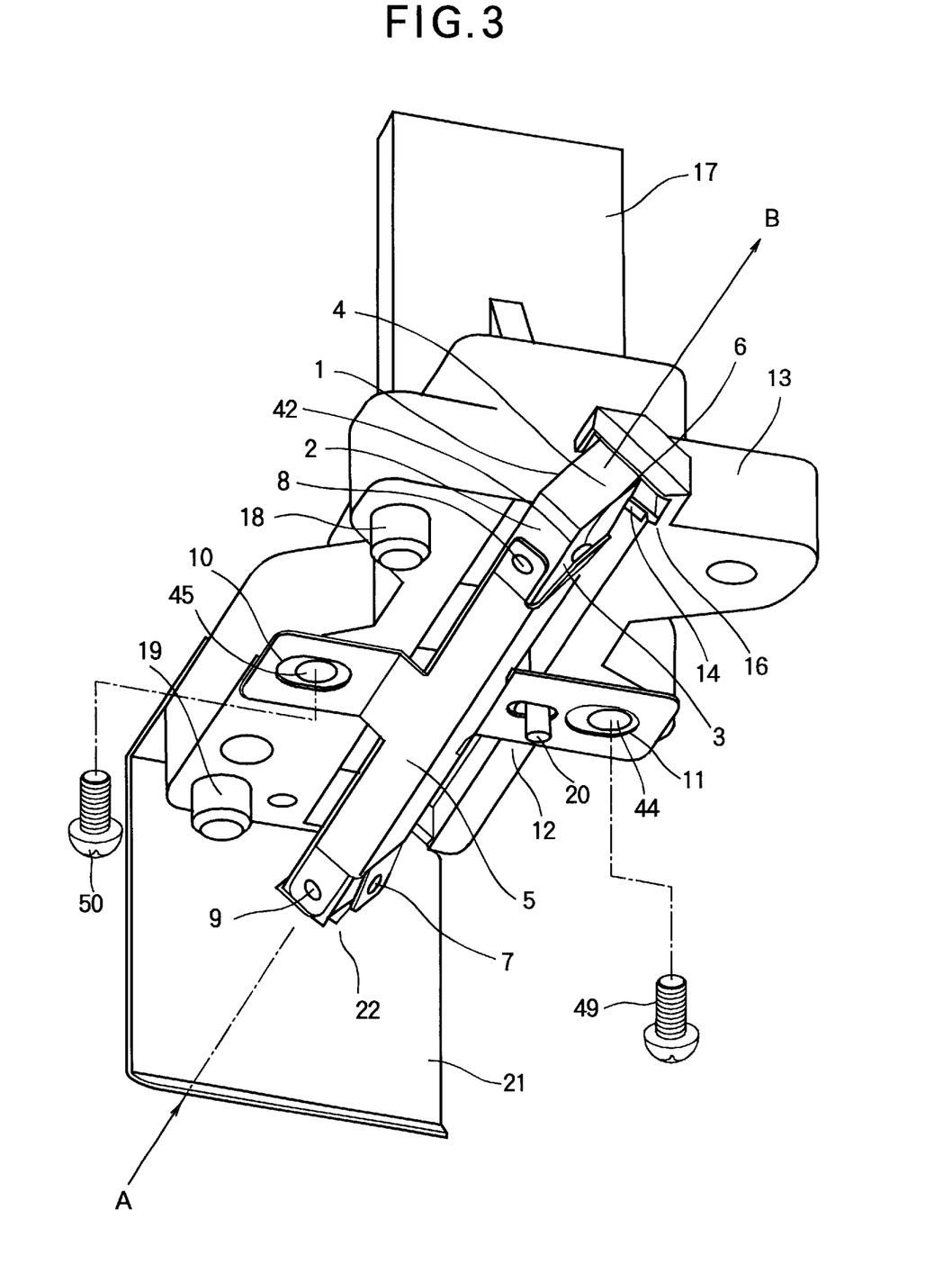
FIG. 3 is a perspective view illustrating the rod integrator fixedly mounted to the holding member.

FIG. 3 is a perspective view, illustrating the rod integrator 1 fixedly mounted to the holding member 13.

Referring to FIG. 3, the rod integrator 1 is firmly urged against the holding member 13 by means of a flat spring 5. The spring 5 has holes 10 and 11 formed therein and spherical projections 6–9 (FIG. 5) with spherical surfaces that abut the rod integrator 1. The holding member 13 has the first contact areas 14 and 15 and a wall 17. The holding member 13 also has positioning pins 18 and 19 and a pin 20, all being in one-piece construction. The holding member 13 has threaded holes 44 and 45 formed therein. The pin 20 is first inserted into the hole 12 formed in the spring 5, and then the spring 5 is positioned such that the holes 10, 11, and 12 are aligned with the threaded holes 44 and 45 and the hole 12, respectively, and finally the spring 5 is securely fixed to the holding member 13 by means of bolts 49 and 50. The holding member 13 has a tongue 16 (FIG. 6) formed in one-piece construction. The tongue 16 engages a part of the exiting surface 4 of the rod integrator 1, thereby fastening the rod integrator 1. The holding member 13 has a mask 21 (FIGS. 4A and 4B) that fixed abuts the incidence surface 38 side. The mask 21 has an engagement portion 22 that engages a part of the incidence surface of the rod integrator 1. The tongue 16 cooperates with the engagement portion 22 to restrict movement of the rod integrator in the longitudinal direction. The light exiting a later described color filter 28 is incident on the rod integrator 1 in a direction shown by arrow A and exits the rod integrator 1 in a direction shown by arrow B.

Figure 4A:
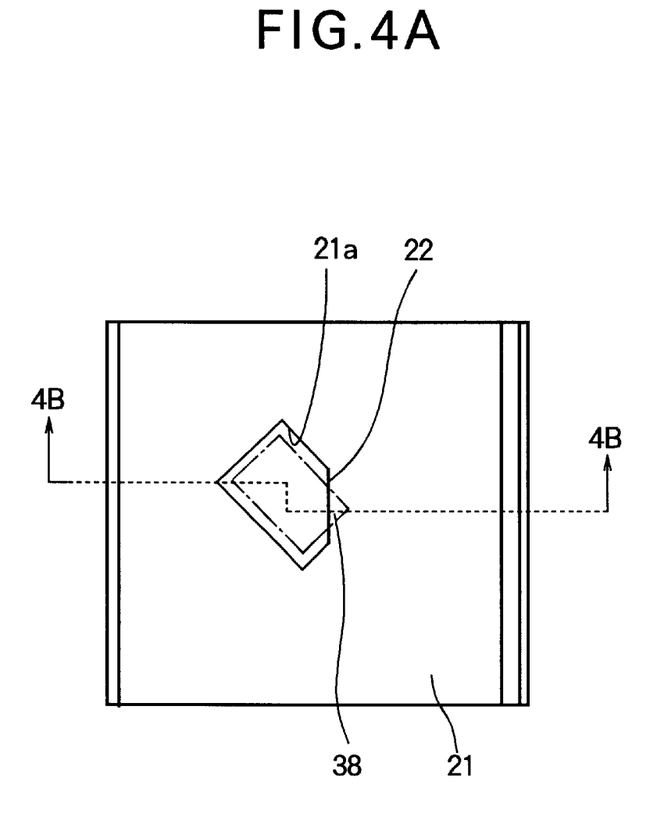
FIG. 4A is a top view of the mask.

FIG. 4A is a top view of the mask 21.

Figure 4B:
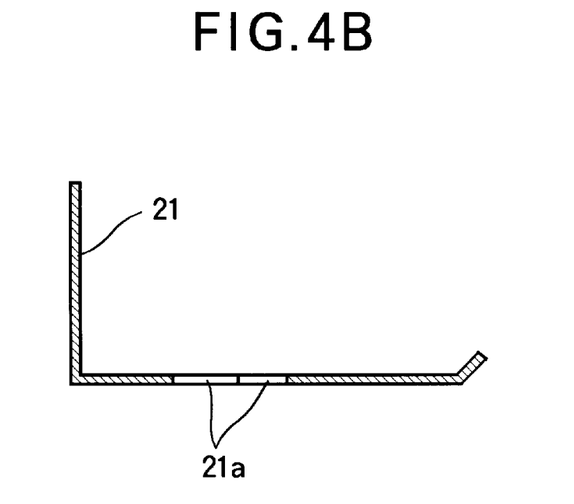
FIG. 4B is a side view of the mask.

FIG. 4B is a side view of the mask 21.

The mask 21 is formed with a window 21a and has the fastening portion 22. The fastening portion 22 abuts a part of the incidence surface 38 of the rod integrator 1.

Figure 5:
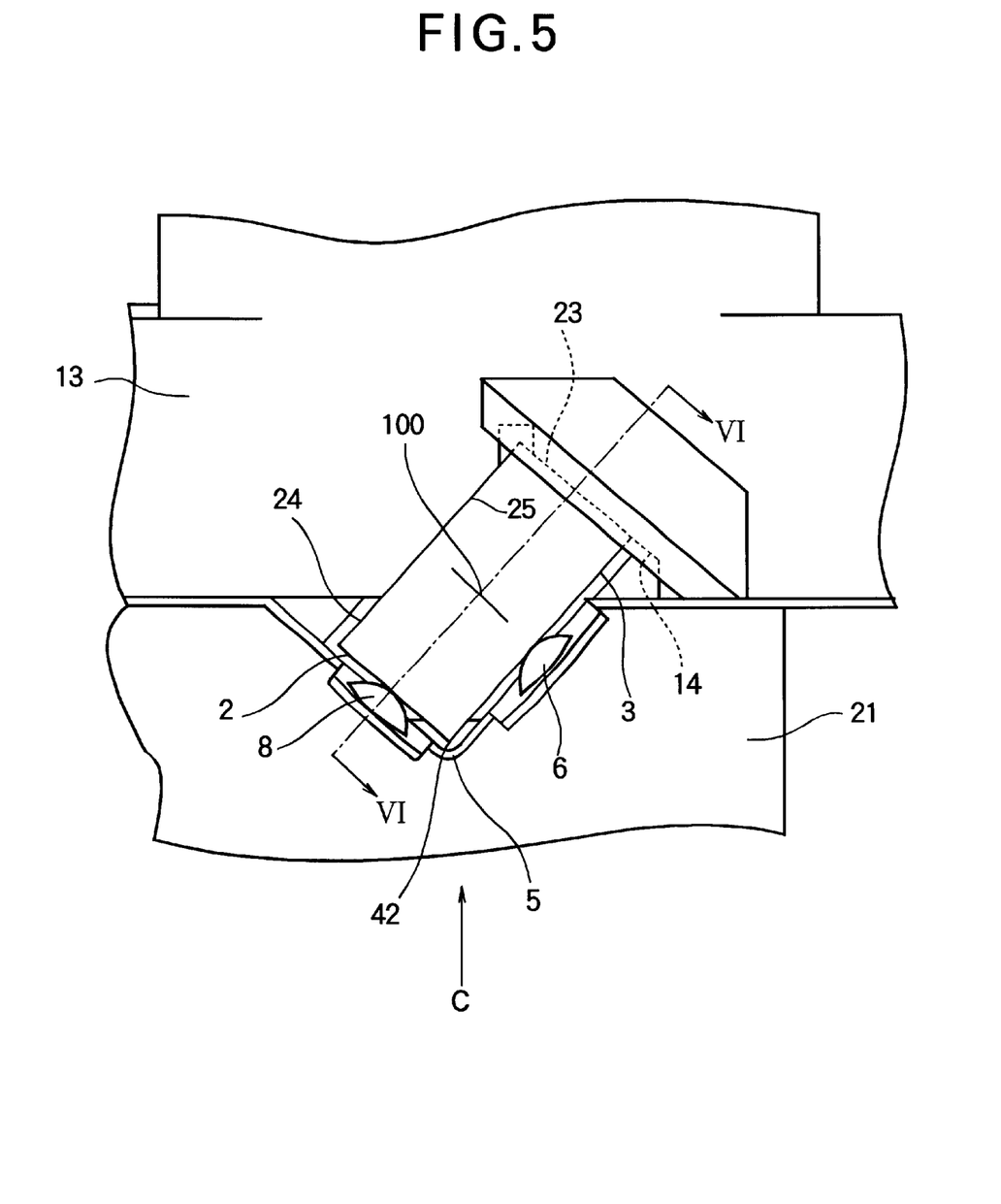
FIG. 5 is a top view of the rod integrator of FIG. 3 as seen from above the exiting surface.

FIG. 5 is a top view of the rod integrator 1 of FIG. 3 as seen from above the exiting surface 4.

Figure 6:
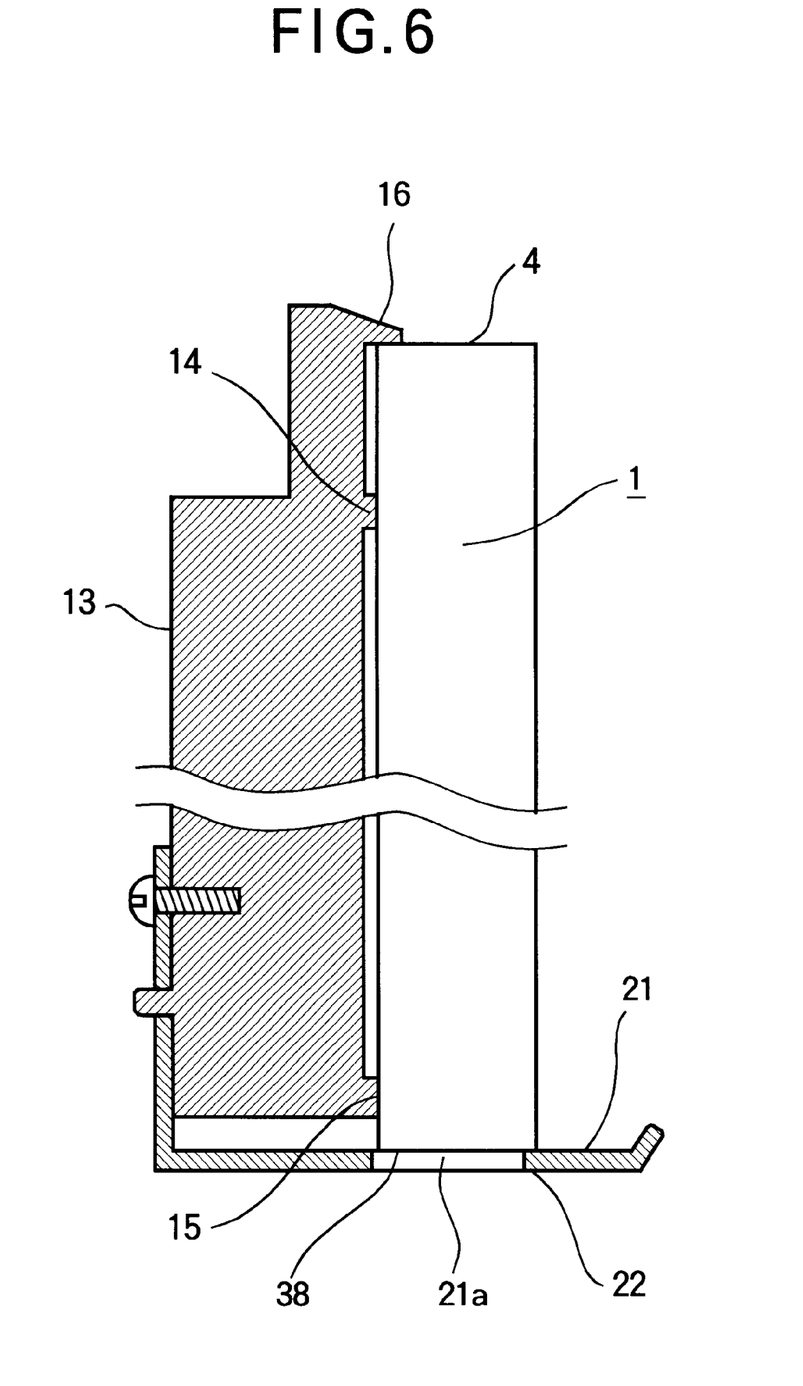
FIG. 6 is a cross-sectional view of the rod integrator taken along lines VII—VII of FIG. 5.

FIG. 6 is a cross-sectional view of the rod integrator taken along lines VII—VII of FIG. 5.

Figure 7:
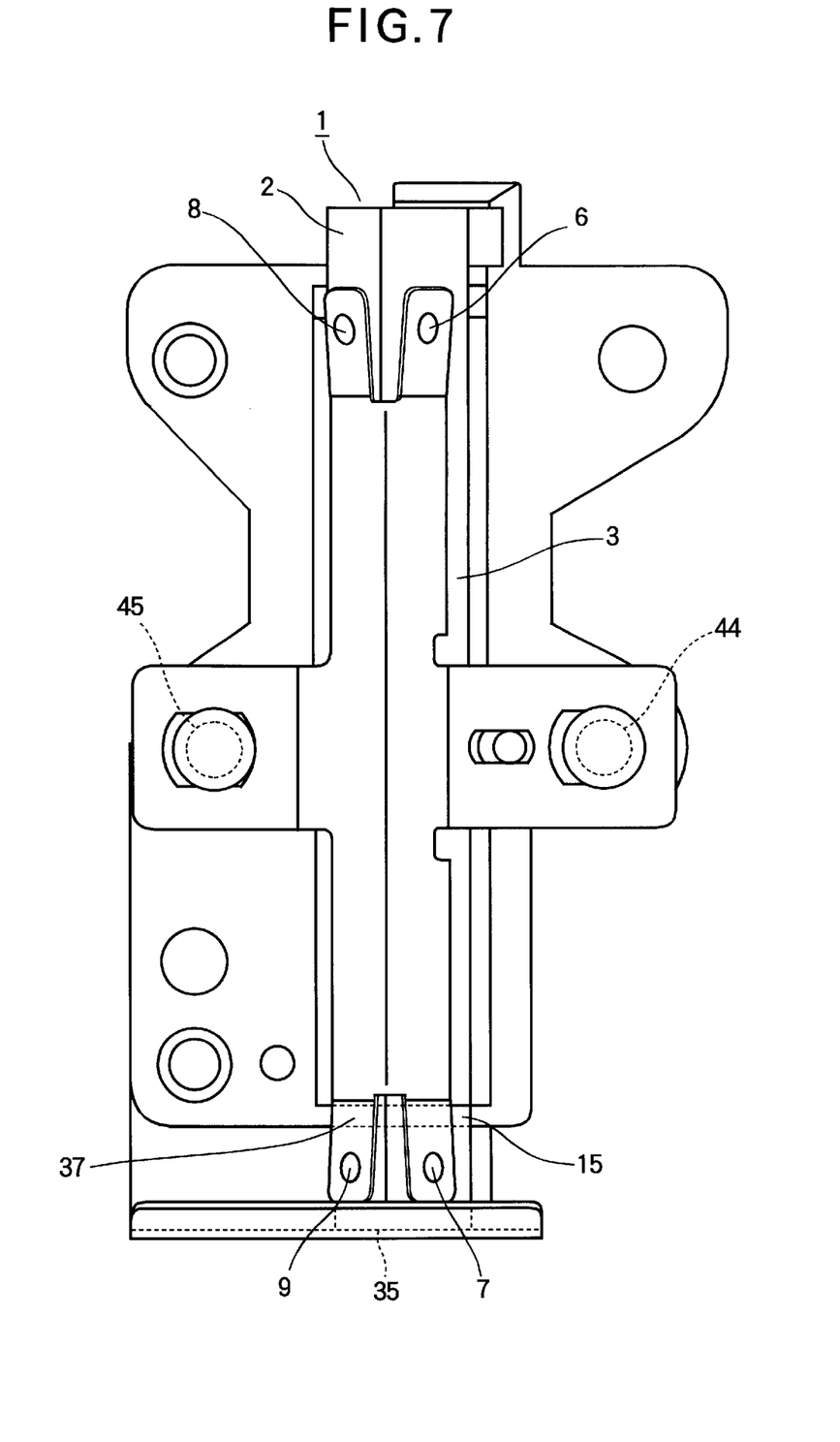
FIG. 7 is a side view of the rod integrator of FIG. 5 as seen in a direction shown by arrow C.

FIG. 7 is a side view of the rod integrator 1 of FIG. 5 as seen in a direction shown by arrow C.

Referring to FIG. 5, the second side surface 23 of the rod integrator 1 is in contact with the first contact surface 14 of the holding member 13, and the fourth side surface 24 is in contact with the second contact surface 25 of the holding member 13. The rod integrator 1 has an aspect ratio of about 16:9, which is suitable for displaying images of, for example, Hi-Vision broad casting. The holding member 13 has contact surfaces 14 and 25 such that the centers of the exiting surface 4 and incidence surface 38 of the rod integrator 1 are coincident with the center or an optical axis 100 of the video image. The contact surfaces 14, 15, 25 and 37 of the holding member 13 are located to oppose the spherical surfaces of the spherical projections 6, 7, 8, and 9 of the spring 5 and receive the urging force of the spring 5.

As shown in FIG. 6, the fastening portions 16 and 22 engage parts of the incidence surface 38 and exiting surface 4 of the rod integrator 1, thereby preventing the rod integrator 1 from displacing in a direction parallel to the optical axis of the rod integrator 1.

Thus, the contact surfaces 14, 15, 25, and 37 can be made as small as possible, so that decreases in the reflection efficiency of the side surfaces of the rod integrator 1 can be as small as possible. Further, the construction allows the rod integrator 1 to remain securely mounted to the holding member 13 after external forces are exerted to the rod integrator 1 due to vibration and impact.

The holding member 13, which has been assembled to the rod integrator 1, is fixedly mounted to the base 58 (FIG. 8) of the video displaying apparatus.

The operation of the video-displaying apparatus according to the embodiment will be described.

Figure 8:
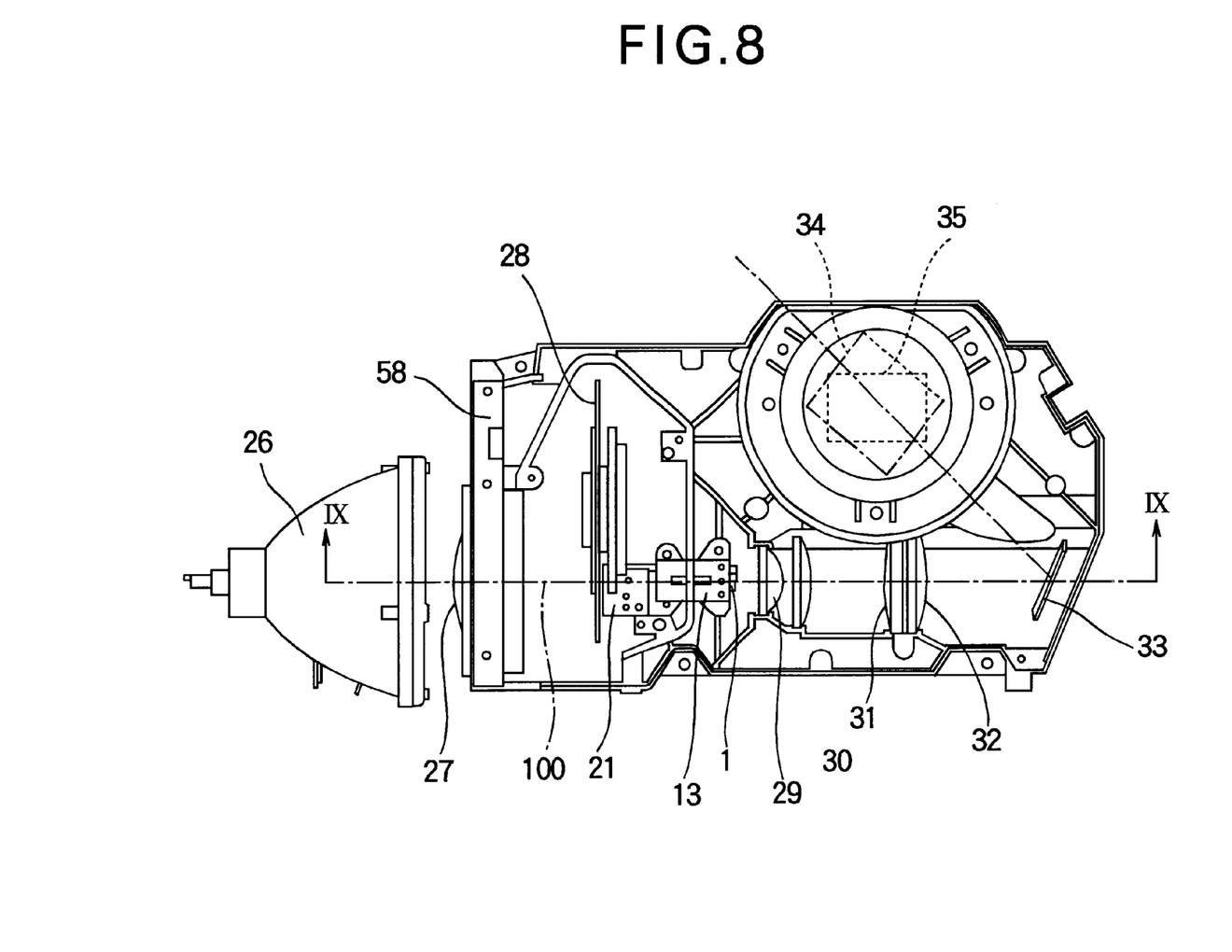
FIG. 8 is a top view of the video-displaying apparatus with the rod integrator and other optical components mounted thereinto.

FIG. 8 is a top view of the video-displaying apparatus with the rod integrator 1 and other optical components mounted thereinto.

Referring to FIG. 8, the light emitted from a lamp 26 in the video-displaying apparatus is gathered by a condenser lens 27, and the light having only wavelengths that can pass the color film 28 is incident on the rod integrator 1. Then, the light is reflected a plurality of times by the respective side surfaces of the rod integrator 1 such that the intensity of light becomes uniform. Then, the light exits the exiting surface 4. The light having uniform intensity passes relay lenses 29–32 and is reflected by a mirror 33.

Figure 9:
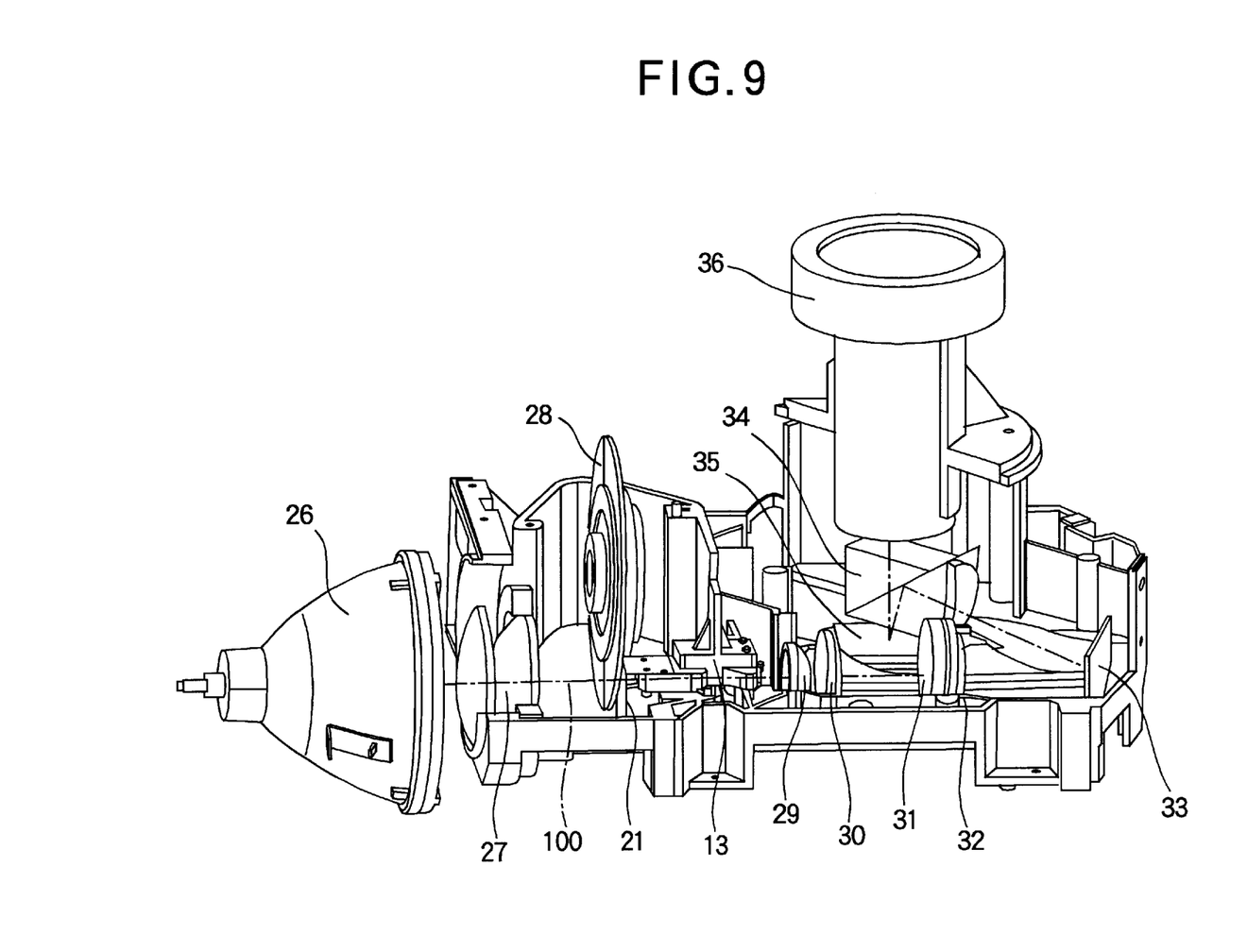
FIG. 9 is a cross-sectional perspective view of a pertinent portion taken along lines IX—IX of FIG. 8.

FIG. 9 is a cross-sectional perspective view of a pertinent portion taken along lines IX—IX of FIG. 8.

The light reflected by the mirror 33 is bent by a prism and then illuminates light valve 35. A drive circuit, not shown, drives the light valve 35 in accordance with a video image signal. The light reflected by the light valve 35 is then enlarged by a projection lens 36. The enlarged video image is projected onto a screen, not shown.

When the light is reflected a plurality of times in the rod integrator 1, surfaces in contact with a material reflect less light because the light-reflecting material absorbs some of the light. Thus, the amount of reflected light decreases in proportion to the area of the reflecting surface in contact with the light-absorbing material. However, the first and third side surfaces 2 and 3 of the rod integrator 1 are only in point contact with spherical surfaces of the spherical projections 6–9. Therefore, the light intensity does not decrease significantly. The surfaces of the projections 6–9 are gently curved such that the stress concentration on the first and third side surfaces 2 and 3 are minimal. Thus, there is no possibility that the rod integrator 1 is cracked.

Referring to FIG. 1, the aspect ratio (i.e., the ratio of a long side to a short side of the incidence surface and exiting surface) of the incidence surface 38 and exiting surface 4 of the rod integrator 1 is 16:9. However, the aspect ratio may be selected to be 4:3, which is suitable for displaying video images such as XGA and SXGA for computer screen.

Second Embodiment

Figure 10:
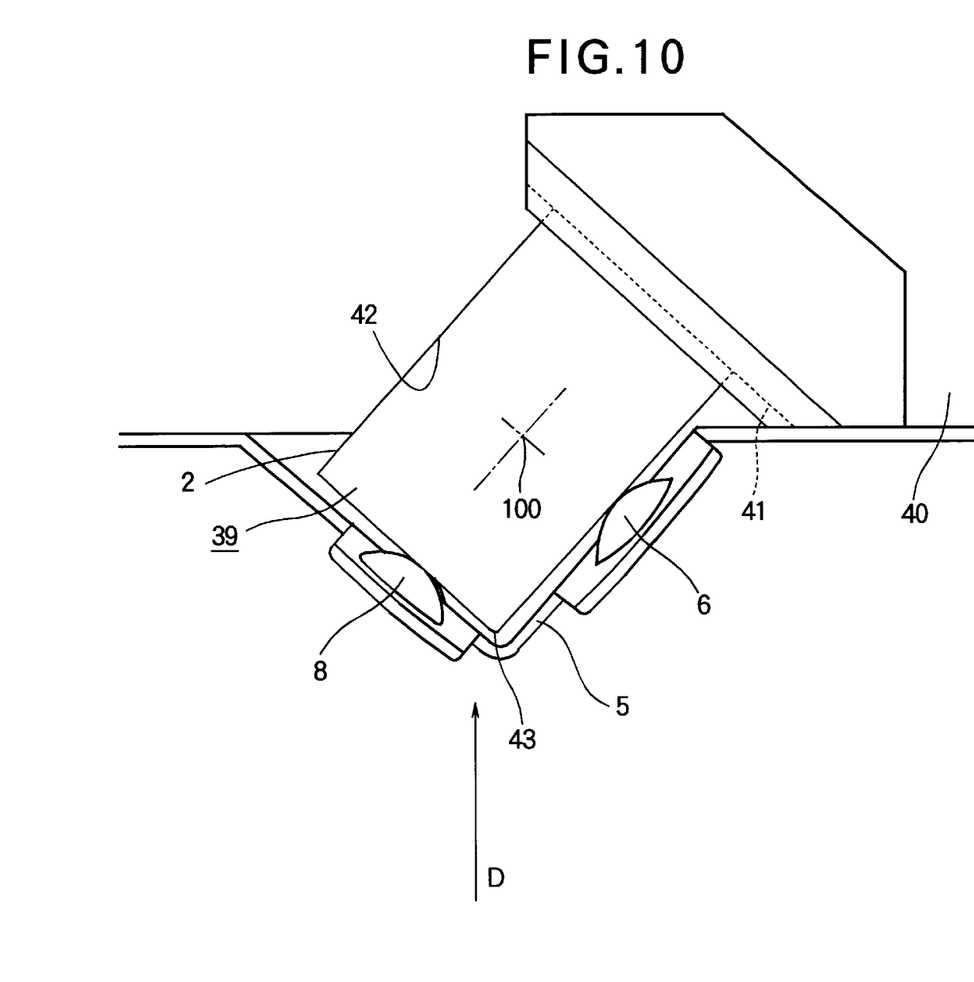
FIG. 10 illustrates another rod integrator and another holding member.

FIG. 10 illustrates another rod integrator 39 and another holding member 40.

The rod integrator 39 has a ratio of the long side and the short side of the incidence surface and exiting surface, i.e., aspect ratio equal to about 4:3. The holding member 40 has contact surfaces 41 and 42 such that the center 100 of the rod integrator 39 is coincident with the center of an incident image.

Thus, when the video displaying apparatus having different aspect ratios is to be manufactured, a video displaying apparatus according to the second embodiment requires only the rod integrator and holding member to be replaced by those having a desired aspect ratio. This implies that many video displaying apparatus having different aspect ratios can use the same base 58, which has a complex shape and includes many optical components mounted thereon.

Referring to FIG. 10, the spring 5 that urges the rod integrator 39 is the same spring that urges the rod integrator 1 (FIG. 5) having an aspect ratio of about 16:9.

Figure 11:
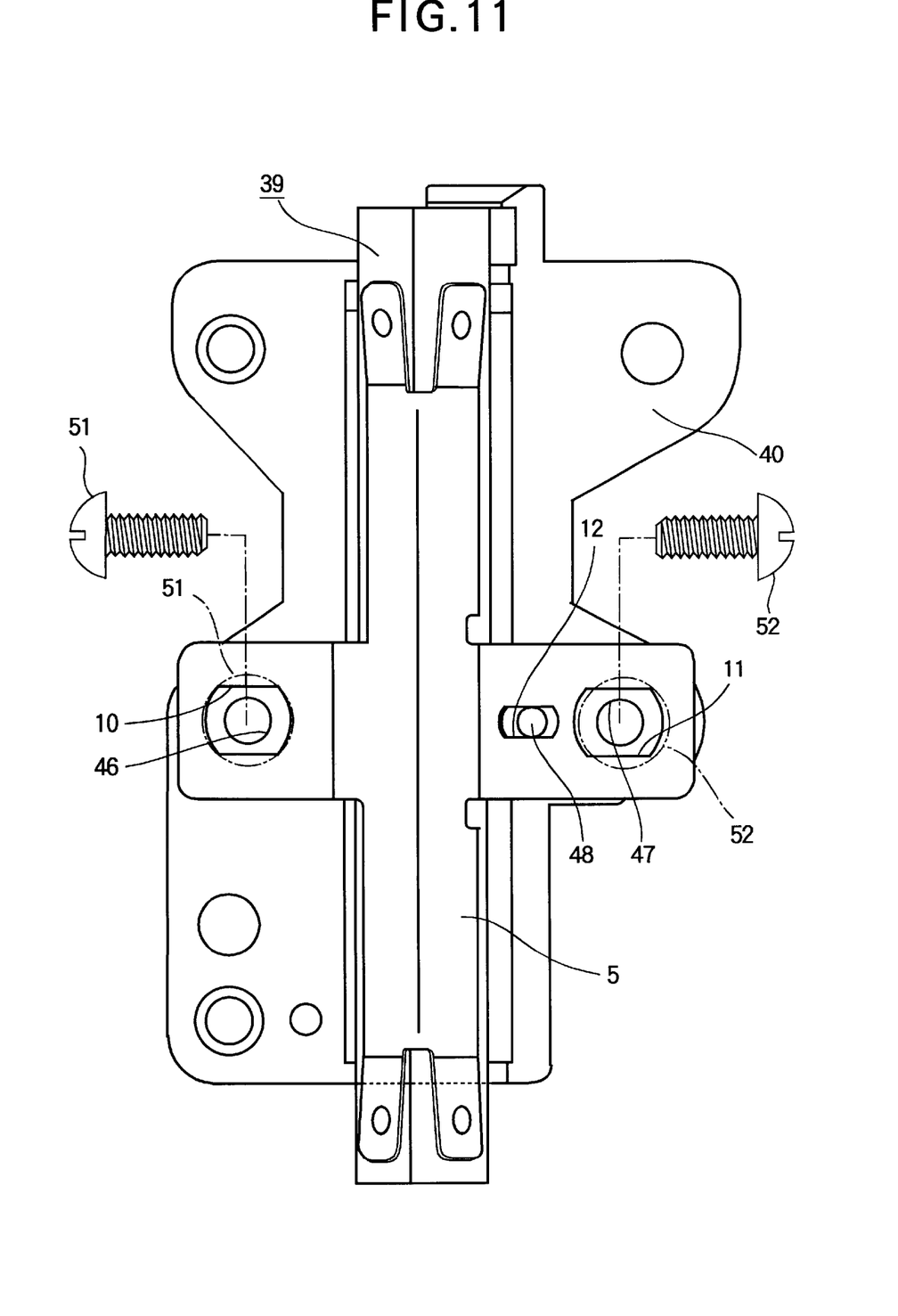
FIG. 11 is a side view of the rod integrator as seen in a direction shown by arrow D of FIG. 10.

FIG. 11 is a side view of the rod integrator 39 as seen in a direction shown by arrow D of FIG. 10.

The rod integrator 39 of FIG. 10 differs from that of FIG. 5 in aspect ratio. In other words, the distance between the center 100 and a corner 43 of FIG. 10 (at which the first side surface 2 and third side surface 23 of the rod integrator 39 come together) is different from that between the center 100 and a corner 42 of FIG. 5 (at which the first side surface 2 and third side surface 23 of the rod integrator 1 come together). Thus, the deflection of the spring 5 fixed to the holding member differs by an amount corresponding to a difference in the distance between the center and the corner. The positions of threaded holes 46 and 47 and pin 48 formed in the holding member 40 are different from those formed in the holding member 13. In order to facilitate the mounting of the spring 5 to the holding member 13 having threaded holes and pins formed at different positions, the spring 5 has holes 10, 11, and 12 elongated in a direction perpendicular to the optical axis. Just as in FIG. 1, bolts 51 and 52 are screwed into the threaded holes 46 and 47, respectively, to fix the spring 5 to the holding member 40.

As described above, the mounting holes 10–12 formed in the spring 5 are elongated. Thus, the same spring can be used to fix the rod integrator 39 to the holding member 40 even when the video-displaying apparatus have different aspect ratios. In other words, it is only necessary to select a rod integrator and a holding member that fit to a desired aspect ratio.

The relay lenses 29–32 of FIG. 8 cause the light exiting the exiting surface 4 of the rod integrator 1 to form an image on the light valve 35. Dust and foreign materials deposited on the exiting surface 4 become a part of a projected video image, thereby deteriorating image quality.

Figure 12:
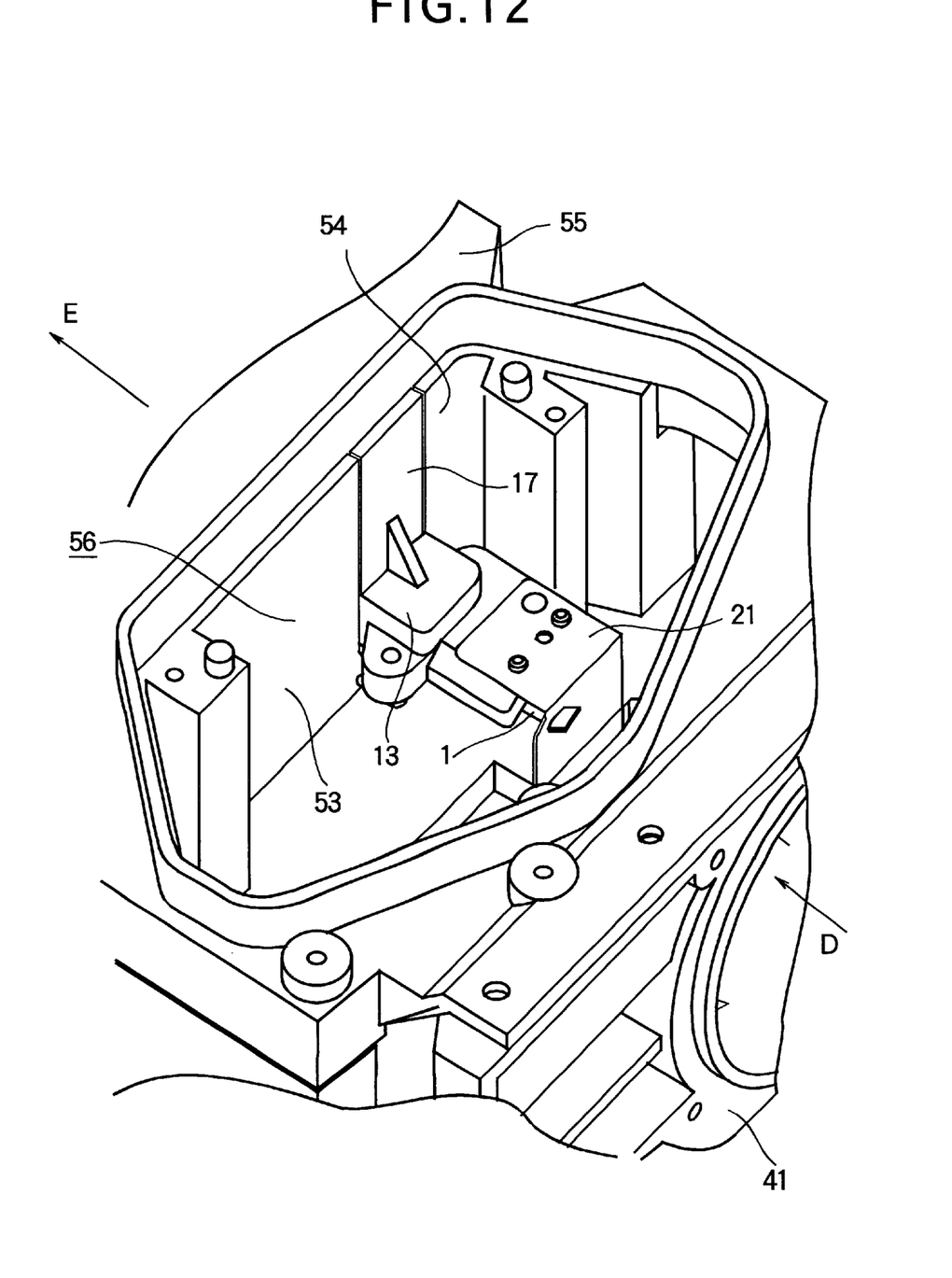
FIG. 12 is a perspective view of a chamber in which the rod integrator is housed.

FIG. 12 is a perspective view of a chamber 56 in which the rod integrator 39 is housed.

FIG. 12 shows the chamber 56 when a lid (FIG. 8) is removed. When the color filter 28 needs to be replaced during maintenance service, the operator removes a cover 55 and replaces the color filter, not shown. The light travels in directions shown by arrows D and E. A wall 17 of the holding member 13 is disposed between walls 53 and 54 of the base 58 such that the wall 17 and walls 53 and 54 are side by side and gaps between the wall 17 and the walls 53 and 54 are minimal. The cover 55 is fixed above the base 58 to prevent dust and foreign materials from entering the chamber 56, thereby protecting the optical components including the rod integrator 1 from the surroundings. The cover 55 is formed with a hole 56 such that if dust and/or foreign material enter various portions of the base 58 when the lid, not shown, is removed from the chamber 56, the walls 41, 53, and 54 block the dust foreign materials. Thus, the dust and foreign materials do not enter the chamber and reach the exiting surface 4 of the rod integrator 1.

Thus, there is no possibility of dust and foreign materials adhering to the exiting surface 4, ensuring image quality after replacement of parts.

Figure 13:
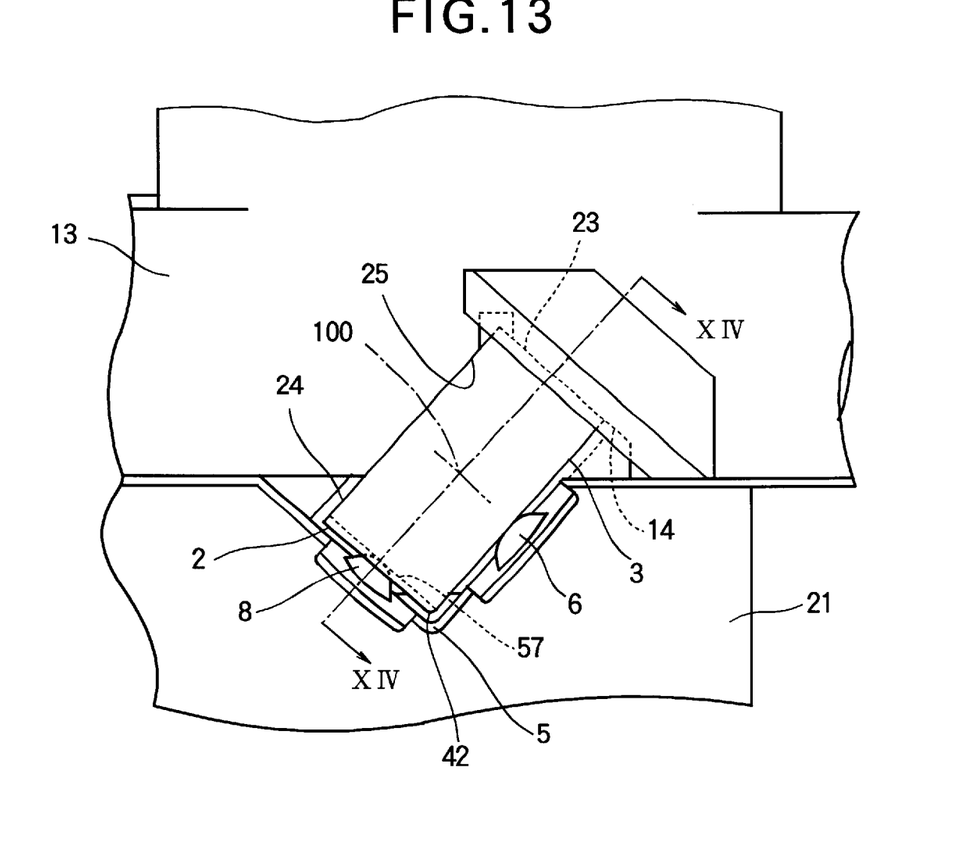
FIG. 13 is a top view of a modified rod integrator and a holding member.

FIG. 13 is a top view of a modified rod integrator and a holding member.

Figure 14:
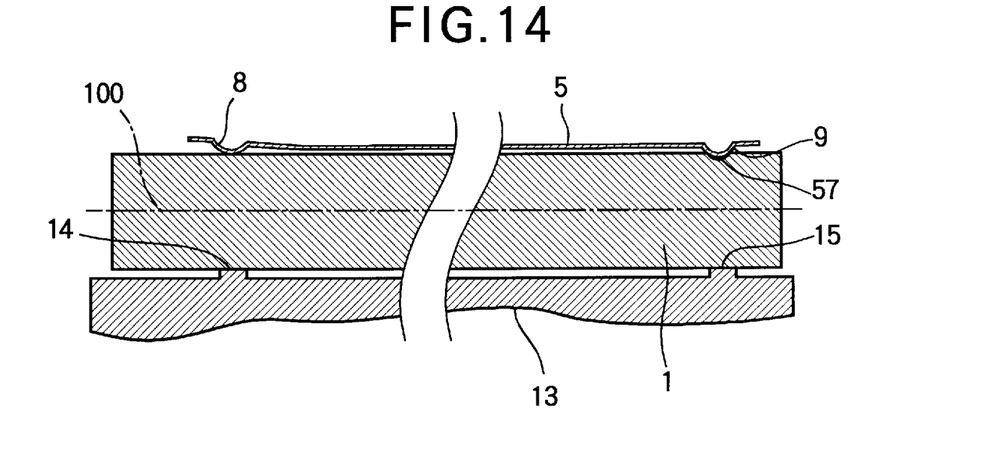
FIG. 14 is a cross-sectional side view taken along lines XIV—XIV of FIG. 13.

FIG. 14 is a cross-sectional side view taken along lines XIV—XIV of FIG. 13.

Instead of the fastening portion 16 as shown in FIG. 6 and the fastening portion 22 as shown in FIG. 4, the rod integrator 1 has a recess 57 extending in a direction perpendicular to the optical axis of the integrator as shown in FIG. 14. The recess 57 receives the spherical projection 9 of the spring 5.

The spring 5 urges the rod integrator 1 against the holding member 13 with the projection 6 engaging the recess 57. Thus, the rod integrator 1 is not only urged against the contact surfaces 14, 15, 25, and 37 but is also restricted in movement relative to the holding member 13 in the direction parallel to the optical axis. Thus, when the rod integrator is subjected to vibration and impact, the engagement between the recesses 57 and spherical projection 9 prevents the rod integrator 1 from displacing in a direction of the optical axis. Thus, the holding member 13 can be reliably fixed without the fastening portions 16 and 22 shown in FIG. 2.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A video-displaying apparatus using a rod integrator that converts light emitted from a light source into uniform light, the apparatus comprising:

a rod integrator having a first surface and a second surface that opposes the first surface;

a holding member having a first contact surface to which the second surface abuts, the first contact surface having a smaller area than the second surface; and a flat spring having at least one projection with a spherical surface;

wherein said rod integrator is fixedly mounted to said holding member such that said rod integrator is sandwiched between said holding member and said flat spring mounted to said holding member;

wherein only the projection abuts the first surface of said rod integrator.

2. The video-displaying apparatus according to claim 1, wherein said rod integrator further includes a third surface and a fourth surface that opposes the third surface;

wherein said holding member includes a second contact surface having a smaller area than the fourth surface;

wherein the at least one projection comprises a plurality of projections and the fourth surface abuts the second contact surface and only the projections abut the first surface and the third surface of said rod integrator.

3. The video-displaying apparatus according to claim 1, wherein said holding member is an assembly separate from a base on which optical components are mounted;

wherein said rod integrator comprises an incidence surface and an exiting surface that have a same aspect ratio as a video image incident on said rod integrator;

wherein said holding member is assembled to the apparatus such that an optical axis of said rod integrator is at a predetermined position regardless of the aspect ratio.

4. The video-displaying apparatus according to claim 3, wherein said spring has at least one elongated hole that extends in a direction substantially perpendicular to the optical axis of said rod integrator.

5. The video-displaying apparatus according to claim 3, wherein said base comprises a chamber in which said rod integrator is housed such that light incident on said rod integrator passes through the chamber;

wherein the holding member has a first wall and said base has a second wall such that the first wall and second wall are disposed side by side to define a part of the chamber, the first wall and second wall being arranged such that a gap between the first wall and second wall is minimal.

6. The video-displaying apparatus according to claim 1, wherein said rod integrator has a recess formed therein and the recess receives the projection.

* * * * *